Patented Aug. 16, 1932

1,871,681

UNITED STATES PATENT OFFICE

JAMES G. FORD, OF WILKINSBURG, PENNSYLVANIA, ASSIGNOR TO WESTINGHOUSE ELECTRIC & MANUFACTURING COMPANY, A CORPORATION OF PENNSYLVANIA

PROCESS OF REFINING OILS

No Drawing.   Application filed June 1, 1927.   Serial No. 195,874.

My invention relates to processes of chemically treating oils, more specifically to processes for refining paraffine oils of the kinds that are particularly useful for lubricating purposes and for insulation as utilized in oil-filled electrical apparatus.

It is among the objects of my invention to provide a process for removing from hydrocarbon oils the alcohols, aldehydes, ketones, esters, acids and other organic bodies derived from the oxidation of the oils.

Another object of my invention is to provide a process for reconditioning oxidized oil that contains sludge and other products of oxidation without changing the character of the oil with respect to its content of saturated and unsaturated hydrocarbons.

When paraffine oil is subjected to heating in the presence of bodies which yield oxygen or to electrical discharge in the presence of such bodies, the oil becomes charged with oxidized hydrocarbons which are manifested mainly as a carbonaceous sludge and as liquids that are acidic in character. The oil becomes sluggish and reactive toward materials such as metal and organic insulating materials and, as a result of the oxidation of the oil, the dissipation of heat through the oil and the insulation of conductors become diminished.

It is the practice, in refining lubricating and insulating oil, to treat it, for a short time, with an excess of sulphuric acid, to remove the excess of acid by decantation, neutralization and washing and then, to dry the oil with calcium chloride or anhydrous sodium carbonate. The dried oil is sometimes treated with fuller's earth and filtered in order to remove coloring matter. As a rule, this process partially removes the acids and other oxidized hydrocarbon products and unsaturates but does not completely remove either of them. In this process, it is difficult to remove all the water that is used to wash out the sulphuric acid. If sulphuric acid, oxidized products or water is present, the oil is unsuitable or inferior for lubricating and insulating purposes. If a paraffine oil is deficient in unsaturates, it will oxidize in service in a short time, and a large amount of acidity will develop in service.

My invention provides a method for treating paraffine hydrocarbon oils and removing the oxidized products without materially affecting the relative amount of unsaturates in the oil and is particularly useful for reconditioning or refining paraffine oils that have been oxidized in service.

In reconditioning paraffine oil, I add fuming sulphuric acid or sulphuric acid having a concentration of at least 95% in an amount sufficient to react with all the oxidized products present, such as the organic acids, esters and sludge, but insufficient to react with the unsaturated hydrocarbons. The acids, esters and sludge are reacted on by the sulphuric acid and the unsaturates are practically unchanged when the oil is treated with a proper amount of acid for the correct period of time. When an oil is thus treated, the oxidized products are precipitated or dissolved in the acid as sulphonated compounds, and a small amount of the acid and sulphonated compounds remain in the oil. I prefer to utilize a slight excess of sulphuric acid in order that all of the oxidation products shall be removed and so that the unsaturated hydrocarbons will be only slightly attacked. The amount of acid to be used with oils of various content of oxidized products may be determined by well-known quantitative methods of analysis or by trial.

The quantity of acid necessary to neutralize the oil is dependent upon the concentration of the acid and the condition of the oil to be treated. When utilizing a sulphuric acid having a specific gravity of 1.84, the quantity of acid may vary between ½% and 8% by volume. Five percent, by volume, of the above mentioned acid was found sufficient to remove the oxidation products from an oil of such acidity that one millogram of potassium hydroxide was required to neutralize 1 gram of oil. The time of agitation was approximately 30 minutes.

When the oil is treated with the appropriate amount of acid to react with the organic oxidation products, the relative amount of unsaturated hydrocarbons remains substantially unaltered in the oil. There may be a slight diminution of the unsaturated hydrocarbons, particularly when too large an excess of acid is used or when the treatment has been carried on for an excessive period of time, but the diminution in one cycle consisting of oxidation and reconditioning is practically insignificant if the process is properly conducted with respect to the amount of acid and the time of treatment.

After the oil is agitated with acid for 5 minutes to ½ hour, depending on the nature of the oil and the amount of the oxidation products in the oil, the heavy dark colored acid and sulphonated products are allowed to settle and the treated oil is decanted.

I have found, in treating paraffine-base oil, that the residue of sulphonated products may be removed from the oil in a single operation without adding water or any other solution that necessitates its removal in a subsequent operation. In my process, the operation of removing the residue of sulphuric acid and oxidized products and the operation of drying and removing objectionable color in the oil is combined in one step. I add silica gel to the oil, agitate the oil and finally decant, filter or centrifuge the oil to remove the silica gel and the adherent residue of oxidized products and acid. The amount of silica gel added is that sufficient to absorb the objectionable residues in the oil, about 5% of the weight of oil being usually sufficient.

The resultant product is an oil containing substantially the same amount of unsaturates as the original oil except the unsaturated compounds which were oxidized in service and it is dry and free from oxidized products and acid. If desired, the amount of unsaturates in the oil may be increased or decreased by mixing the oil with another oil containing a higher or a lower content of unsaturates, as the case may be.

When the term "unsaturated compounds" is used in the specification and claims, compounds are referred to which have a double linkage between two adjacent carbon atoms or compounds that are resinous in character which impart a yellow color to the oil and act as anti-oxidizing agents.

I have described a specific modification of my invention, various modifications of which may be made without departing from the spirit and scope thereof. Therefore, I desire to be limited only by the prior art and by what is defined in the annexed claims.

I claim as my invention:

1. The method of reconditioning insulating oils having a paraffine-base and containing a slight amount of water and oxidation products which comprises adding a sufficient amount of fuming sulphuric acid to the oil to react with the water and oxidation products therein, agitating the oil and acid for a period sufficient to remove said oxidation products with said acid and for an insufficient period to remove substantial quantities of the unsaturates and then treating the oil with silica-gel.

2. In the process of reconditioning insulating oils having a paraffine base and containing oxidized products in which the same is treated with concentrated sulphuric acid to remove the oxidized products therefrom, the step which consists in treating said oil with a sufficient amount of fuming sulphuric acid for a time sufficient to react with only the oxidized products of the oil.

In testimony whereof, I have hereunto subscribed my name this 26th day of May, 1927.

JAMES G. FORD.